US012781294B2

(12) United States Patent
Izard et al.

(10) Patent No.: US 12,781,294 B2
(45) Date of Patent: Nov. 3, 2026

(54) DEVICE TO INJECT A REDUCING GAS INTO A SHAFT FURNACE

(71) Applicant: ArcelorMittal, Luxembourg (LU)

(72) Inventors: Edouard Izard, Saint Julien les Metz (FR); Dominique Sert, Montoy Flanville (FR); Jérôme Daulmerie, Dunkirk (FR)

(73) Assignee: ArcelorMittal, Luxembourg (LU)

( * ) Notice: Subject to any disclaimer, the term of this patent is extended or adjusted under 35 U.S.C. 154(b) by 672 days.

(21) Appl. No.: 18/026,061

(22) PCT Filed: Sep. 15, 2020

(86) PCT No.: PCT/IB2020/058565

§ 371 (c)(1),
(2) Date: Mar. 13, 2023

(87) PCT Pub. No.: WO2022/058772

PCT Pub. Date: Mar. 24, 2022

(65) Prior Publication Data

US 2023/0366049 A1 Nov. 16, 2023

(51) Int. Cl.

*C21B 7/16* (2006.01)
*C21B 7/06* (2006.01)

(Continued)

(52) U.S. Cl.

CPC .................. *C21B 7/16* (2013.01); *C21B 7/06* (2013.01); *F27B 1/12* (2013.01); *F27B 1/16* (2013.01)

(58) Field of Classification Search

CPC .. C21B 7/16; C21B 7/06; C21B 5/001; C21B 5/06; F27B 1/12; F27B 1/16; F27D 1/16

(Continued)

(56) References Cited

U.S. PATENT DOCUMENTS 1,298,761 A * 4/1919 Miller ........................ C21B 7/16 414/201
1,793,849 A * 2/1931 Groninger ................. C21B 7/16 122/6.6

(Continued)

FOREIGN PATENT DOCUMENTS

CN 103998627 A 8/2014
CN 211339575 U 8/2020

(Continued)

OTHER PUBLICATIONS

WO2022058770 A1 / PCT/IB2020/058562, Mar. 24, 2022, In English, filed as U.S. Appl. No. 18/025,973, filed Mar. 13, 2023.

(Continued)

*Primary Examiner* — Jessee R Roe
*Assistant Examiner* — Michael Aboagye
(74) *Attorney, Agent, or Firm* — Davidson Kappel LLC

(57) ABSTRACT

A device to inject a reducing gas into a shaft furnace includes an external casing whose front face is provided with an outlet for gas injection into the shaft furnace, an internal casing located inside the external casing wherein reducing gas is circulating. The internal casing has an opening matching the gas injection outlet of the front face of the external casing. The front face of the external casing includes an upper and a lower part and the gas injection outlet is in the lower part and inwards from the upper part.

12 Claims, 4 Drawing Sheets

(51) Int. Cl.
*F27B 1/12* (2006.01)
*F27B 1/16* (2006.01)

(58) Field of Classification Search
USPC .................................. 266/265, 266, 47, 270
See application file for complete search history.

(56) References Cited

U.S. PATENT DOCUMENTS

| | | | | |
|---|---|---|---|---|
| 1,837,090 | A | 12/1931 | Wright | |
| 1,994,115 | A * | 3/1935 | Stoecker | C21B 7/16 266/266 |
| 2,023,025 | A * | 12/1935 | Mckee | C21B 7/163 138/148 |
| 2,501,265 | A | 3/1950 | Diaz et al. | |
| 3,547,624 | A | 12/1970 | Gray et al. | |
| 3,814,404 | A | 6/1974 | Claflin et al. | |
| 3,881,710 | A | 5/1975 | Dmitrievich | |
| 4,371,151 | A * | 2/1983 | Gammon | C21B 7/16 75/660 |
| 4,572,487 | A * | 2/1986 | Slagley | C21B 7/16 266/265 |
| 4,750,716 | A * | 6/1988 | Reeve-Parker | C21C 5/4613 266/225 |
| 5,295,666 | A | 3/1994 | Rollot et al. | |
| 6,129,776 | A | 10/2000 | Naito et al. | |
| 8,992,664 | B2 * | 3/2015 | Didelon | C21B 9/00 75/464 |
| 2005/0027493 | A1 | 2/2005 | Gupta et al. | |
| 2008/0203630 | A1 | 8/2008 | Weber et al. | |
| 2010/0032020 | A1 | 2/2010 | Labegorre | |
| 2012/0007291 | A1 | 1/2012 | Goedert et al. | |

FOREIGN PATENT DOCUMENTS

| | | | |
|---|---|---|---|
| DE | 2114077 | A1 | 10/1971 |
| EP | 2848705 | A1 | 3/2015 |
| EP | 3093352 | A1 | 11/2016 |
| EP | 2796567 | B1 | 9/2017 |
| EP | 3480324 | A1 | 5/2019 |
| GB | 945312 | | 12/1963 |
| GB | 1317826 | A | 5/1973 |
| JP | H05171236 | | 7/1993 |
| JP | 2002220609 | A | 8/2002 |
| JP | 2003171708 | | 6/2003 |
| WO | WO2013168784 | | 11/2013 |
| WO | WO 2022/058772 | A1 | 3/2022 |
| WO | WO 2022/058773 | A1 | 3/2022 |
| WO | WO 2022/058774 | A1 | 3/2022 |
| WO | WO2022058770 | A1 | 3/2022 |
| WO | WO 2022058771 | A1 | 3/2022 |

OTHER PUBLICATIONS

WO 2022058771 A1 / PCT/IB2020/058563, Mar. 24, 2022, In English, filed as U.S. Appl. No. 18/025,987, filed Mar. 13, 2023.
WO 2022058773 A1 / PCT/IB2020/058569, Mar. 24, 2022, In English, filed as U.S. Appl. No. 18/026,003, filed Mar. 13, 2023.
WO 2022058774 A1 / PCT/IB2020/058570, Mar. 24, 2022, In English, filed as U.S. Appl. No. 18/026,046, filed Mar. 13, 2023.
WO 2022058772 A1 / PCT/IB2020/058565, Mar. 24, 2022, In English, filed as U.S. Appl. No. 18/026,061, filed Mar. 13, 2023.
Search Report of PCT/IB2021/058562 of May 10, 2021 and International Report on Patentability.
Search Report of PCT/IB2021/058563 of Apr. 16, 2021 and International Report on Patentability.
Search Report of PCT/IB2021/058570 of Apr. 22, 2021 and International Report on Patentability.
Search Report of PCT/IB2021/058569 of Apr. 21, 2021 and International Report on Patentability.
Search Report of PCT/IB2021/058565 of Apr. 30, 2021 and International Report on Patentability.

* cited by examiner

DEVICE TO INJECT A REDUCING GAS INTO A SHAFT FURNACE

The invention is related to a device for injection of a reducing gas into a shaft furnace.

BACKGROUND

In blast furnaces, the conversion of the iron-containing charge (sinter, pellets and iron ore) to cast iron, or hot metal, is conventionally carried out by reduction of the iron oxides by a reducing gas (in particular containing CO, H2 and N2), which is formed by combustion of coke at the tuyeres located in the bottom part of the blast furnace where air preheated to a temperature between 1000° C. and 1300° C., called hot blast, is injected.

In order to increase the productivity and reduce the costs, auxiliary fuels are also injected at the tuyeres, such as coal in pulverized form, fuel oil, natural gas or other fuels, combined with oxygen enrichment of the hot blast.

The gas recovered in the upper part of the blast furnace, called top gas, mainly consists of CO, CO2, H2 and N2 in respective proportions of 20-28% v, 17-25% v, 1-5% v and 48-55% v. Despite partial use of this gas as fuel in other plants, such as power plants, blast furnace remains a significant producer of CO2.

SUMMARY OF THE INVENTION

In view of the considerable increase in the concentration of CO2 in the atmosphere since the beginning of the last century and the subsequent greenhouse effect, it is essential to reduce emissions of CO2 where it is produced in a large quantity, and therefore in particular at blast furnaces.

For this purpose, during the last 50 years, the consumption of reducing agents in the blast furnace has been reduced by half so that, at present, in blast furnaces of conventional configuration, the consumption of carbon has reached a low limit linked to the laws of thermodynamics.

One known way of additionally reducing CO2 emissions is to reintroduce top gases that are purified of CO2 and that are rich in CO into the blast furnace, said blast furnaces are known as TGRBF (Top-Gas Recycling Blast Furnaces). The use of CO-rich gas as a reducing agent thus makes it possible to reduce the coke consumption and therefore the CO2 emissions. This injection may be done at two levels, at the classical tuyere level, in replacement of hot blast and in the reduction zone of the blast furnace, for example in the lower part of the stack of the blast furnace.

Injection at the tuyere level may be performed at the location of the existing equipment. However, in current practice there is no injection at the reduction zone level and new equipment must thus be installed. This equipment will be in contact with the burden charged in the furnace and will thus be subjected to shocks and abrasion. Moreover, the burden may comprise some fines and volatiles matter which can clog or foul the injection outlet and thus request a change in the device.

There is so a need for a device allowing injection of reducing gas which has an improved lifetime. There is notably a need for a device with a limited risk of clogging by matters charged into the furnace. There is also a need for a device which is light and easy to implement.

The present invention provides a device which comprises an external casing having a rear and a front face, said front face being provided with an outlet for gas injection into the shaft furnace, an internal casing located inside the external casing wherein reducing gas is circulating, said internal casing having an opening matching the gas injection outlet of the front face of the external casing, wherein the front face comprises an and upper and a lower part, the gas injection outlet being located in the lower part and the lower and upper parts being designed so that the injection outlet is located inwards from the upper part.

The device of the invention may also comprise the following optional characteristics considered separately or according to all possible technical combinations:

- a refractory layer is located between the external and the internal casings,
- the internal casing is made of steel having a resistance to temperature up to 1200° C.,
- the device does not comprise any cooling system,
- the shaft furnace is a blast furnace,
- the device is bolted to the shaft furnace,
- the device comprises reinforcing plates to support the internal casing,
- the internal casing is designed so that injection of the reducing gas inside the shaft furnace is performed downwards,
- designed so that injection of the reducing gas inside the shaft furnace is performed at an angle $\alpha$ with the perpendicular to the shaft furnace internal wall comprised between 0 and 30°,
- the device comprises a stone box in the upper part of the front face,
- the front face has a triangular shape,
- the lower part is in recess from the upper part,
- the lower part is chamfered from the upper part.

BRIEF DESCRIPTION OF THE DRAWINGS

Other characteristics and advantages of the invention will emerge clearly from the description of it that is given below by way of an indication and which is in no way restrictive, with reference to the appended figures in which.

DETAILED DESCRIPTION

Elements in the figures are for illustration only and may not have been drawn to scale. Same references are used for same elements from one figure to another.

Figure 1:
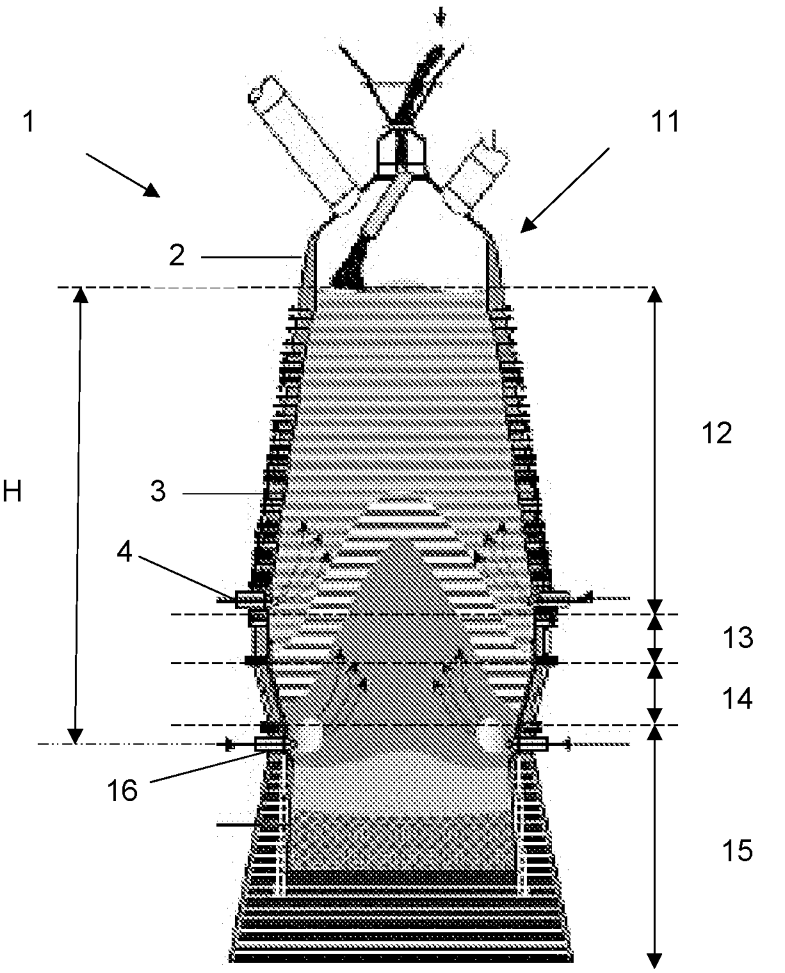
FIG. 1 illustrates a side view of a blast furnace equipped with reducing gas injection devices
Figure 3:
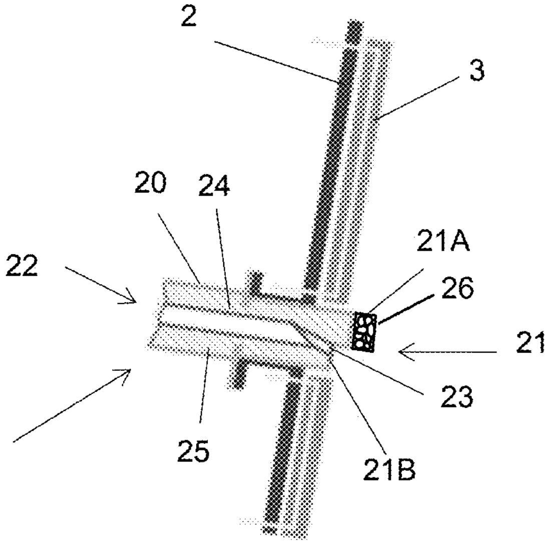
FIG. 3 illustrates an injection device according to a first embodiment of the invention

FIG. 1 is a side view of a blast furnace according to the invention. The blast furnace 1, comprises, starting from the top, a throat 11 wherein materials are loaded and gas exhaust, a stack (also called shaft) 12, a belly 13, a bosh 14 and a hearth 15. The materials loaded are mainly iron-bearing materials such as sinter, pellets or iron ore and carbon-bearing materials such as coke. The hot blast injection necessary to carbon combustion and thus iron reduction is performed by tuyeres 16 located between the bosh 14 and the hearth 15. In terms of structure, the blast furnace has an external wall, or shell 2, this shell 2 being covered, on the inside of the blast furnace, by a refractory lining and staves 3, as illustrated in FIG. 3, forming an internal wall 5. To reduce consumption of coke, which is the main carbon provider for iron reduction, it has been envisaged to inject a reducing gas in the blast furnace in addition to the hot blast. This reducing gas injection is performed in the stack of the blast furnace, preferentially in the lower part of the stack 12, for example just above the belly 13. In a preferred embodiment the reducing gas injection is performed at a distance from the classical tuyere level, comprised between 20% and 70%, preferentially between 30 and 60% of the working height H of the furnace. The working height H of a blast furnace is the distance between the level of injection of hot blast through classical tuyeres and the zero level of charging, as illustrated in FIG. 1.

Figure 2:
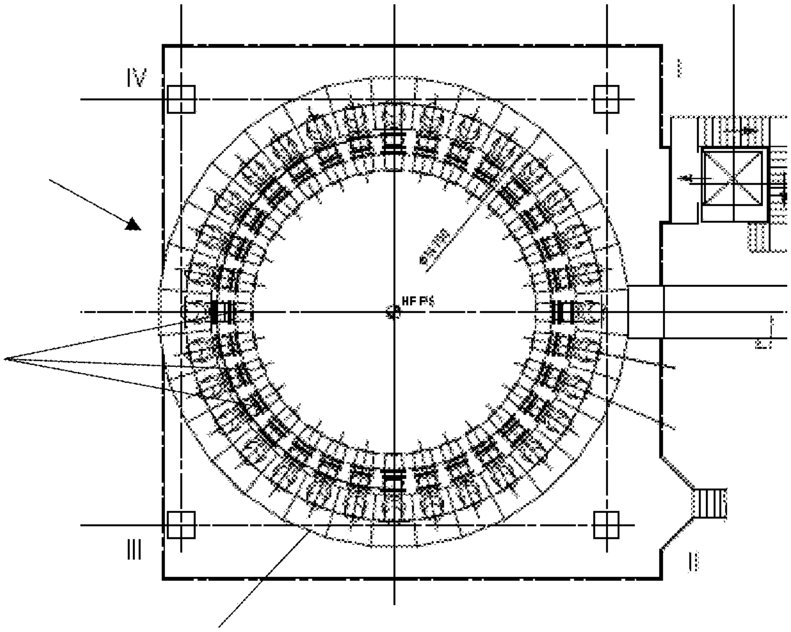
FIG. 2 illustrates a top view of a blast furnace with reducing gas injection

The injection is performed through several injection devices 4 around the circumference of the furnace, as illustrated in FIG. 2, which is a top view of the blast furnace 1 at the level of injection of the reducing gas. In a preferred embodiment there are as many injection outlets as staves forming the internal wall 2. Between 200 and 700 $Nm^3$ of reducing gas are injected per tons of hot metal in the blast furnace.

Figure 4:
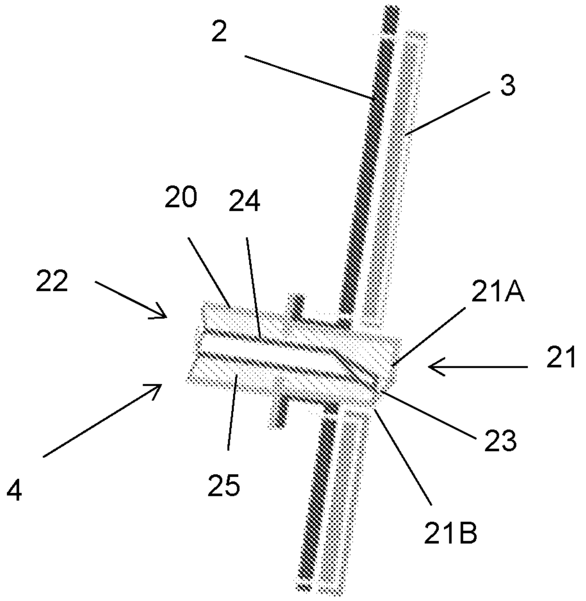
FIG. 4 illustrates an injection device according to a second embodiment of the invention
Figure 5:
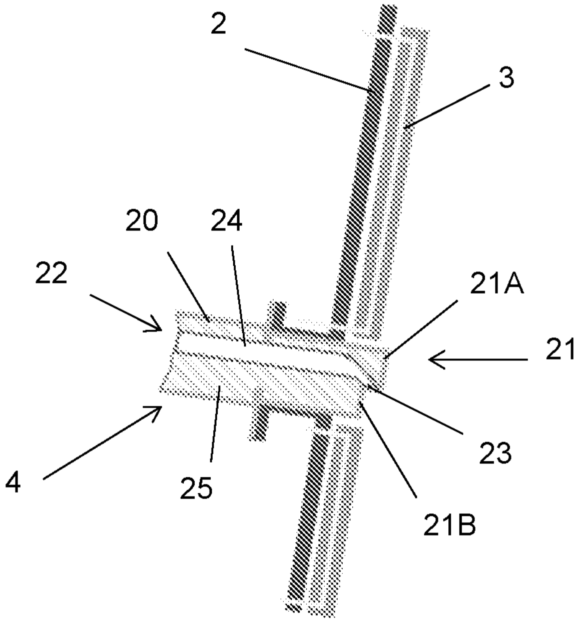
FIG. 5 illustrates an injection device according to a second embodiment of the invention

FIGS. 3 to 5 illustrate an injection device 4 according to different embodiments of the invention. In all embodiments the injection device 4 comprises an external casing 20 having a front face 21 and a rear face 22. The front face 21 is the face located inside the furnace and is provided with an outlet 23 for injecting the reducing gas into the furnace. The injection device 4 further comprises an internal casing 24 located inside the external casing 20. This internal casing 24 is preferentially made of a steel able to resist to a temperature up to 1200° C., preferably of stainless steel. It could also be made of copper. This internal casing 24 has an opening matching the gas injection outlet 23 of the front face 21 of the external casing 20.

The front face 21 of the injection device 4 comprises at least two parts, an upper 21A and a lower part 21B comprising the gas injection outlet 23. These upper and lower parts are designed so that the gas injection outlet 23 is located inwards from the upper part 21A so that this upper part protects the gas injection outlet 23 from the burden falling inside the furnace. This allows to create a cavity without material around the gas injection outlet 23 when gas is injected and thus to avoid the injection outlet to become dirty and/or to be clogged. This improves the lifetime of the injection device 4.

The internal casing 24 is able to transport the reducing gas, having a temperature comprised between 800° C. and 1200° C., up to the gas injection outlet 23 so that said reducing gas is injected into the blast furnace 1. The internal casing 24 and the gas injection outlet 23 are designed so that the injection of the reducing gas inside the blast furnace stack is performed downwards, preferably at an angle $\alpha$ with the perpendicular to the internal wall comprised between 0 and 30°. The diameter of the internal casing 24 is chosen to fulfil required speed injection in the blast furnace. In a preferred embodiment this speed is comprised between 75 and 200 m/s. In another embodiment it is inferior to 60 m/s. The refractory layer 25 allows to mitigate the variation of temperature of the reducing gas circulating into the internal casing 12.

A refractory layer 25 may furthermore be provided between the external 20 and the internal casing 24.

In the embodiment of FIG. 3, the lower part 21B is in recess from the upper part 21A and the gas injection outlet 23 is located in the recessed lower part 21B and is thus protected by the upper part 21A which acts as a cap.

In the embodiment of FIG. 4, the lower part 21B is chamfered from the upper part 21A and the gas injection outlet 23 is located in the inwards chamfered lower part 21B.

In the embodiment of FIG. 5, the external casing 20 has the same design as the embodiment of FIG. 3 but the injection outlet 23 is located at a different location of the lower part 21B.

Figure 6:
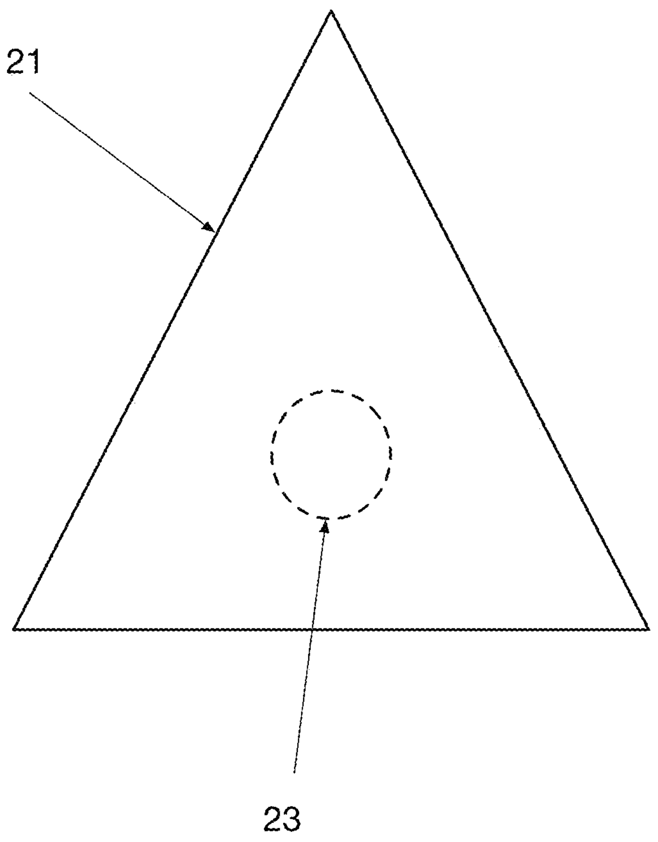
FIG. 6 illustrates a view of the front face of the external casing having a triangular shape.

FIG. 6 illustrates a view of the front face 21 of the external casing 20 having a triangular shape.

In all embodiments, the injection device 4 may be provided on its front face with a stone box structure 26 (see FIG. 3) which aims to locally reinforce the external casing 20 and protect it from the burden falling into the furnace and thus to improve the lifetime of the injection device 4.

The injection device according to anyone of the previous embodiments is attached to the shell of the blast furnace 1. It may be bolted or welded to this shell.

The injection device according to any of the previous embodiments may be preferentially used for injection of a reducing gas at shaft level in a blast furnace and more specifically in a Top Gas Recycling Blast furnace. This reducing gas contains preferentially between 65% v and 75% v of carbon monoxide CO, between 8% v and 15% v of hydrogen H2, between 1% v and 5% v of carbon dioxide CO2, remainder being mainly nitrogen N2. It is preferentially injected at a temperature comprised between 85° and 1200° C.

The invention claimed is:

1. A device to inject a reducing gas into a shaft furnace, the device comprising:

an external casing having a rear and a front face, the front face being provided with an outlet for gas injection into the shaft furnace;

an internal casing located inside the external casing, the reducing gas passing through the internal casing, the internal casing having an opening to a gas injection outlet of the front face of the external casing;

the front face including an upper part and a lower part, the gas injection outlet being located in the lower part and the lower and upper parts being designed so that the gas injection outlet is located inwards from the upper part, the device including a stone box on the upper part of the front face.

2. The device as recited in claim 1 further comprising a refractory layer located between the external casing and the internal casing.

3. The device as recited in claim 1 wherein the internal casing is made of steel having a resistance to temperature up to 1200° C.

4. The device as recited in claim 1 wherein no cooling system is present.

5. The device as recited in claim 1 wherein the shaft furnace is a blast furnace.

6. The device as recited in claim 1 wherein the device is bolted to the shaft furnace.

7. The device as recited in claim 1 wherein the internal casing is designed so that injection of the reducing gas inside the shaft furnace is performed at an angle perpendicular to the shaft furnace internal wall, the angle being between 0 and 30°.

8. The device as recited in claim 1 wherein the front face of the external casing has a triangular shape.

9. The device as recited in claim 1 wherein the lower part is recessed from the upper part.

10. The device as recited in claim 1 wherein the lower part is chamfered from the upper part.

11. The device as recited in claim 1 wherein the upper part is solid.

12. The device as recited in claim 1 wherein the stone box is configured to protect the upper part of the front face of the external casing from burden falling into the shaft furnace.

* * * * *